US012027299B2

(12) United States Patent
Fu et al.

(10) Patent No.: US 12,027,299 B2
(45) Date of Patent: Jul. 2, 2024

(54) WINDING ASSEMBLY AND MAGNETIC ELEMENT

(71) Applicant: Delta Electronics (Shanghai) CO., LTD, Shanghai (CN)

(72) Inventors: Qi Fu, Shanghai (CN); Haibin Song, Shanghai (CN); Daofei Xu, Shanghai (CN); Zengyi Lu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 665 days.

(21) Appl. No.: 17/226,458

(22) Filed: Apr. 9, 2021

(65) Prior Publication Data

US 2021/0350973 A1 Nov. 11, 2021

(30) Foreign Application Priority Data

May 7, 2020 (CN) ......................... 202010376192.1

(51) Int. Cl.
*H01F 27/28* (2006.01)
*H01F 27/24* (2006.01)

(52) U.S. Cl.
CPC ......... *H01F 27/2804* (2013.01); *H01F 27/24* (2013.01); *H01F 2027/2809* (2013.01)

(58) Field of Classification Search
CPC ................. H01F 27/2804; H01F 27/24; H01F 2027/2809; H01F 27/2823; H01F 2027/2814; H01F 2027/2819; H01F 27/34
USPC ......................................... 336/221, 5, 55–60
See application file for complete search history.

(56) References Cited

U.S. PATENT DOCUMENTS 4,012,703 A * 3/1977 Chamberlayne ........ H01F 19/08 336/200
6,429,763 B1 * 8/2002 Patel .................. H01F 27/2804 336/200
7,091,814 B2 * 8/2006 Kyriazidou ............ H01L 28/10 336/200

(Continued)

FOREIGN PATENT DOCUMENTS

CN 201601008 U 10/2010
CN 101171652 B 3/2014

(Continued)

OTHER PUBLICATIONS

The Extended European Search Report dated Sep. 30, 2021 for EP patent application No. 21167175.5.

(Continued)

*Primary Examiner* — Shawki S Ismail
*Assistant Examiner* — Kazi S Hossain
(74) *Attorney, Agent, or Firm* — Qinghong Xu

(57) ABSTRACT

Present disclosure provides a winding assembly and a magnetic element. The winding assembly includes a circuit board with a central hole and a first winding wound around the central hole in the circuit board; the first winding includes N turns of coil on at least two wiring layers; a second end of at least one turn of coil on a first wiring layers is connected to a first end of next turn of coil at corresponding position on a second wiring layer of the circuit board. The magnetic element includes a magnetic core and a winding assembly sleeved on a magnetic leg.

14 Claims, 4 Drawing Sheets

(56) References Cited

U.S. PATENT DOCUMENTS

| | | | | |
|---|---|---|---|---|
| 7,932,801 | B2 * | 4/2011 | Loef | H01F 17/0006 336/200 |
| 2002/0149461 | A1 | 10/2002 | Patel et al. | |
| 2005/0212640 | A1 | 9/2005 | Chiang et al. | |
| 2007/0290784 | A1 | 12/2007 | Nesse et al. | |
| 2008/0197960 | A1 | 8/2008 | Hasegawa et al. | |
| 2008/0211613 | A1 * | 9/2008 | Lin | H01F 27/2866 336/83 |
| 2008/0284552 | A1 * | 11/2008 | Lim | H01L 23/5227 336/200 |
| 2010/0253153 | A1 | 10/2010 | Kondo et al. | |
| 2011/0285215 | A1 | 11/2011 | Hatase et al. | |
| 2016/0217913 | A1 | 7/2016 | Cheng et al. | |
| 2016/0336106 | A1 | 11/2016 | Chung et al. | |
| 2018/0174737 | A1 * | 6/2018 | Song | H01F 27/24 |

FOREIGN PATENT DOCUMENTS

| | | | |
|---|---|---|---|
| CN | 102460612 | B | 4/2015 |
| CN | 102782780 | B | 5/2015 |
| CN | 106653318 | A | 5/2017 |
| CN | 206471205 | U | 9/2017 |
| CN | 107533661 | A | 1/2018 |
| CN | 108352861 | A | 7/2018 |
| CN | 208189365 | U | 12/2018 |
| CN | 208189370 | U | 12/2018 |
| CN | 109215992 | A | 1/2019 |
| CN | 208570304 | U | 3/2019 |
| CN | 208848724 | U | 5/2019 |
| CN | 110289156 | A | 9/2019 |
| JP | 2011086655 | A | 4/2011 |
| WO | 2013046259 | A1 | 4/2013 |

OTHER PUBLICATIONS

Non-Final Rejection dated Oct. 26, 2023 of U.S. Appl. No. 17/232,531.

Notice of Allowance dated Oct. 28, 2023 of Chinese Application No. 2020103761921.

1st Office Action dated Nov. 15, 2022 of Chinese Application No. 202010376192.1.

Non-Final Office Action dated Jan. 19, 2024 for U.S. Appl. No. 17/226,521.

* cited by examiner

WINDING ASSEMBLY AND MAGNETIC ELEMENT

CROSS REFERENCE TO RELATED APPLICAITON

The present application is based upon and claims the priority of Chinese Patent Application No. 202010376192.1, titled "WINDING ASSEMBLY AND MAGNETIC ELEMENT" filed on May 7, 2020. The entire content of this Chinese patent application is incorporated herein by reference.

TECHNICAL FIELD

The present disclosure relates to the technical field of power electronics, in particular, to a winding assembly and a magnetic element.

BACKGROUND

Miniaturization and high power density have become the development trend of switching mode power supplies. Magnetic components such as inductors and transformers, are important in switching mode power supply design. In order to meet requirements of miniaturization, planar transformers have been widely used. The higher the switching frequency, the smaller the size of the transformer. Planar transformers have obvious advantages in volume and flexibility over traditional transformers. However, a parasitic capacitor generated between turns of coil in existing planar transformer is large, which affects efficiency of the switching mode power supplies and improvement of high power density.

The above information disclosed in the background section is only for enhancing the understanding of the background of the present disclosure, so it may include information that does not constitute prior art known to those of ordinary skill in the art.

SUMMARY

The present disclosure provides a winding assembly and a magnetic element, which may reduce the parasitic capacitance of the winding assembly.

Other characteristics and advantages of the present disclosure will become apparent from the following detailed description, or will be partly learned by practicing the present disclosure.

According to first aspect of the present disclosure, there is provided a winding assembly, including: a circuit board with a central hole; and a first winding wound around the central hole in the circuit board and including N turns of coil located on at least two wiring layers; wherein, a second end of at least one turn of coil on a first wiring layer is connected to a first end of next turn of coil at corresponding position on a second wiring layer of the circuit board.

According to second aspect of the present disclosure, there is provided a winding assembly, including: a circuit board with a central hole; and a first winding wound around the central hole in the circuit board and including N turns of coil located on at least two wiring layers; wherein, for at least some turns of the N turns of the coil, any two turns that are corresponding to each other in a direction perpendicular to a plane of the circuit board are formed by winding one after another, and the two turns of the coil are adjacent to each other in the direction perpendicular to the plane of the circuit board and electrically connected to each other.

According to third aspect of the present disclosure, there is provided a magnetic element including a magnetic core and a winding assembly, the winding assembly being sleeved on a magnetic leg of the magnetic core and including: a circuit board with a central hole; and a first winding wound around the central hole in the circuit board and including N turns of coil located on at least two wiring layers; wherein, for at least some turns of the N turns of the coil, any two turns that are corresponding to each other in a direction perpendicular to a plane of the circuit board are formed by winding one after another, and the two turns of the coil are adjacent to each other in the direction perpendicular to the plane of the circuit board and electrically connected to each other.

It should be understood that the above general description and the following detailed description are only exemplary and it is not intended to constitute a limitation to the present disclosure.

BRIEF DESCRIPTION OF THE DRAWINGS

The above and other objects, features, and advantages of the present disclosure will become more apparent by describing in detail exemplary embodiments thereof with reference to the accompanying drawings.

DETAILED DESCRIPTION

Figure 1:
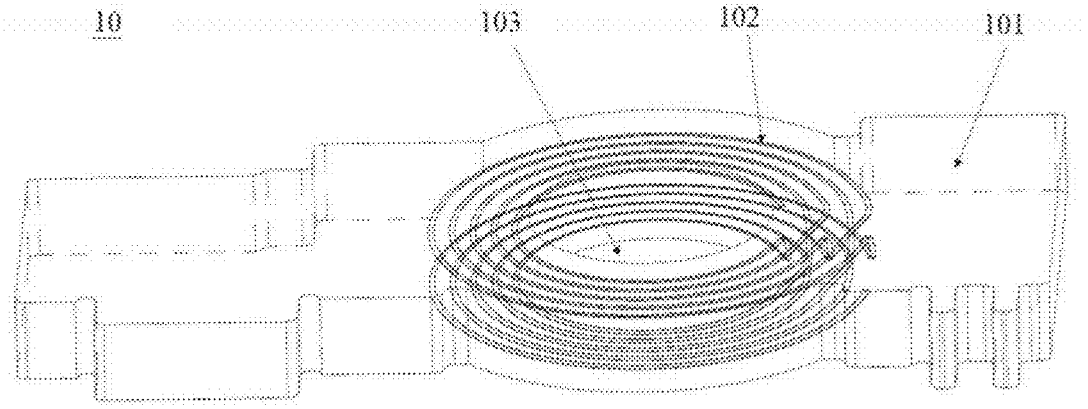
FIG. 1 a schematic structural diagram of a winding assembly according to an exemplary embodiment.

Example embodiments will now be described more fully with reference to the drawings. However, exemplary embodiments may be implemented in various forms, and should not be construed as being limited to examples set forth herein; on the contrary, these embodiments are provided to make the present disclosure more comprehensive and complete, and to fully convey concept of the exemplary embodiments for those skilled in the art. The drawings are only schematic illustrations of the present disclosure and are not necessarily drawn to scale. The same reference numerals in the drawings denote the same or similar parts, and thus their repeated description will be omitted.

Furthermore, the described features, structures, or characteristics may be combined in one or more embodiments in any suitable manner. In the following description, many specific details are provided to give a full understanding of the embodiments of the disclosure. However, those skilled in the art will realize that the technical solutions of the present disclosure may be practiced with omitting one or more of the specific details, or other methods, components, devices, steps, etc. may be used. In other instances, well-known structures, methods, devices, implementations, or operations have not been shown or described in detail to avoid obscuring the subject and obscuring aspects of the present disclosure.

The terms "first" and "second" are used for descriptive purposes only and may not be understood as indicating or implying relative importance or implicitly indicating the number of technical features indicated. Thus, the features defined as "first" and "second" may explicitly or implicitly include one or more of the features.

FIG. 1 a schematic structural diagram of a winding assembly according to an exemplary embodiment.

Figure 2:
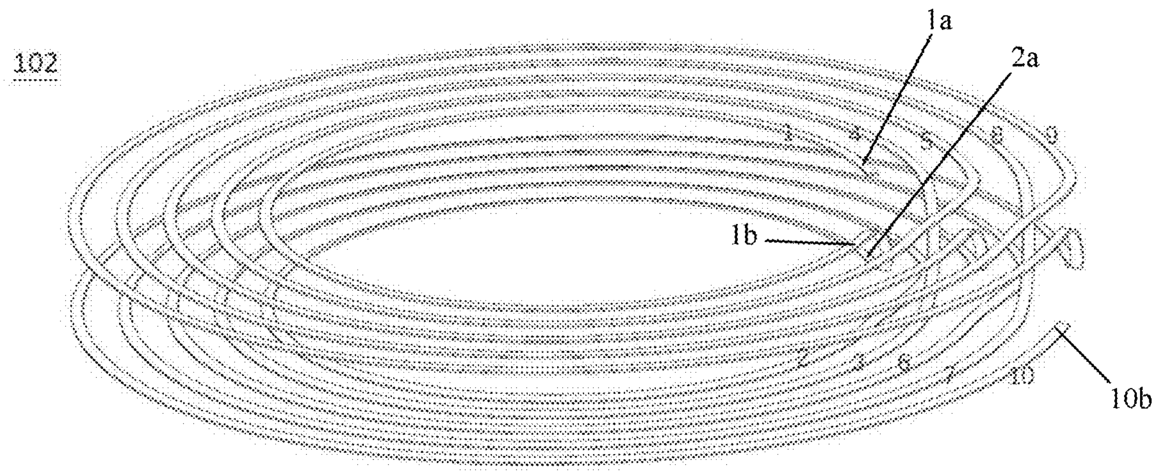
FIG. 2 is a schematic diagram of a winding method according to an exemplary embodiment.

FIG. 2 is a schematic diagram of a winding method according to an exemplary embodiment.

As shown in FIG. 1 and FIG. 2, a winding assembly 10 includes a circuit board 101 and a first winding 102 disposed on a plurality of wiring layers in the circuit board 101. In some embodiments, the circuit board 101 may be Printed Circuit Board (PCB), The first winding 102 is formed by winding around a central hole 103 in the circuit board 101. The first winding 102 includes N turns of coil on the plurality of wiring layers. A second end of at least one turn of the coil on a first wiring layer is connected to a first end of next turn of coil at corresponding position on a second wiring layer, and a first end of a first turn of the coil and a second end of a last turn of the coil serves as a starting-end and a finishing-end of the first winding, respectively. That is, in the first winding 102, at least two turns (which are corresponding to each other in direction perpendicular to a plane of the circuit board) of the N turns of the coil are winding one after another, so the two turns of the N turns of the coil are adjacent to each other in a direction perpendicular to a plane of the circuit board, and further electrically connected to each other directly. So the two turns which are corresponding to each other in direction perpendicular to a plane of the circuit board are not only physically adjacent, but also electrically adjacent.

Specifically, in the winding assembly 10 shown in FIG. 1 and FIG. 2, the first winding 102 is located in two wiring layers of the circuit board. For example, five turns of coil are provided on each layer, and a total of 10 turns of coil are provided, which is not limited thereto. As shown in FIGS. 1 and 2, reference number 1 represents a first turn of the coil, reference number 2 represents a second turn of the coil, and so on. Ten turns of the coil from 1 to 10 surround the central hole 103 in an order from 1 to 10. Five turns of the coil (1, 4, 5, 8, 9) belong to a first layer of coil, and five turns of the coil (2, 3, 6, 7, 10) belong to a second layer of coil. The first turn of the coil 1 and the second turn of the coil 2 corresponding to each other are a first group, the third turn of the coil 3 and the fourth turn of the coil 4 corresponding to each other are a second group, and so on. Two turns of the coil corresponding to each other, such as the first turn and the second turn, may be connected through a via.

In an embodiment, for example, as shown in FIG. 2, the winding assembly has 10 turns of the coil, a first end 1*a* of the first turn of the coil 1 is a starting-end of the first winding 102, and a second end 1*b* of the first turn of the coil 1 passes through an insulation layer to a second layer in the circuit board and then is wound to form the second turn of the coil 2. That is, a second end 1*b* of the first turn of the coil 1 wound in the first layer in the circuit board is connected to a first end 2*a* of the second turn of the coil 2 in the second layer. Therefore, the first turn of the coil 1 and the second turn of the coil 2 are not only physically adjacent, that is, adjacent to each other in a direction perpendicular to a plane of the circuit board, but also electrically connected to each other, and the first turn of the coil 1 and the second turn of the coil 2 are wound one after another in a winding order. Further, after the third turn of the coil 3 is formed in the second layer of the circuit board, the second end of the third turn of the coil 3 passes through the insulation layer to the first layer in the circuit board, and is wound to form the fourth turn of the coil 4. That is, a second end of the third turn of the coil 3 wound in the second layer of the circuit board is connected to a first end of the fourth turn of the coil 4 in the first layer. Therefore, the third turn of the coil 3 and the fourth turn of the coil 4 are not only adjacent to each other in a direction perpendicular to a plane of the circuit board, but also electrically connected to each other, and the third turn of the coil 3 and the fourth turn of the coil 4 are wound one after another in a winding order. Repeat the above steps, until forming a tenth turn of the coil 10. Thus, the first end of the first turn of the coil 1 and a second end 10*b* of the tenth turn of the coil 10 form the starting-end and the finishing-end of the first winding 102, respectively.

Further, the first end of the first turn of the coil 1 and/or the second end of the tenth turn of the coil 10, that is, the starting-end and/or the finishing-end of the first winding may be connected to an external circuit or device.

Further, in some embodiments, positions of the two turns of coil corresponding to each other in each group may be interchanged. For example, the positions of the first turn of coil 1 and the second turn of coil 2 may be interchanged. For example, the positions of the third turn of coil 3 and the fourth turn of coil 4 may be interchanged. That is, the winding order may be interchanged. For example, after winding the second turn of coil 2 on the second layer of the circuit board, the coil may pass through the insulation layer to the first layer of the circuit board and is wound to form the third turn of coil 3, and then pass through the insulation layer to the second layer of the circuit board and is wound to form the fourth turn of coil 4. The present disclosure is not limited thereto.

Since the two turns of the coil adjacent to each other in the direction perpendicular to the plane of the circuit board are the two turns of the coil electrically connected to each other, every two turns of the coil adjacent to each other in the direction perpendicular to the plane of the circuit board has a same voltage difference. Assuming that the voltage between the starting-end and the finishing-end of the first winding 101 is $V_p$, the voltage between the two turns of the coil adjacent to each other in the direction perpendicular to the plane of the circuit board is $V_p/10$, which is the minimum voltage difference that may be achieved in theory.

In some embodiments, for example, if the voltage between the starting-end and the finishing-end of the first winding is $V_p$, the first winding includes N turns of the coil wound in two wiring layers of the circuit board, in the direction perpendicular to the plane of the circuit board, the voltage between the two turns of the coil adjacent to each other is $V_p/N$.

Specifically, a parasitic capacitance of the winding assembly in the circuit board may be determined by the following equation:

$$C_p = \sum_{x=1}^{i}\left(C_{p_x} \times \frac{V_{p_x}}{V_p}\right) \quad \text{Equation (1)}$$

where, $C_p$ is an overall parasitic capacitance between two layers of coil in the circuit board, $C_{p_x}$ is a parasitic capacitance between corresponding turns of the coil (i.e., the turns of the coil which are corresponding to each other in direction perpendicular to a plane of the circuit board), $V_{p_x}$ is a voltage between the corresponding turns of the coil, $V_p$ is a voltage between the starting-end and the finishing-end of the first winding in the circuit board, and i is the number of groups of the corresponding turns of the coil.

According to the above Equation (1), when the voltage received by the first winding is $V_p$, compared with the winding in the related art, the coil of the winding assembly 10 of the present disclosure can reduce the parasitic capacitance of the winding assembly and improve the conversion efficiency, since the voltage $V_{px}$ between the two corresponding turns of the coil in the present disclosure is reduced. Taking two layers as an example, the voltage between corresponding turns of the coil of each group is $V_p/N$, that is, $V_{px}=V_p/N$, which is the theoretical minimum, and thus the parasitic capacitance of the winding assembly 10 may be reduced and the conversion efficiency may be improved.

Wherein, the first winding 102 shown in FIGS. 1 and 2 is located in two wiring layers in the circuit board, which is not limited thereto. The winding 102 may be disposed in a plurality of wiring layers. For example, after the first turn is wound in the first layer in the circuit board, the second turn is wound in the second layer, and then the third turn is wound in the third layer; after that, the fourth turn is wound outward in the third layer, the fifth turn is wound in the second layer, and the sixth turn is wound in the first layer. The present disclosure is not limited thereto. It may also realize that a second end of one turn of the coil on one wiring layers is connected to a first end of one turn of the coil at a corresponding position on an adjacent wiring layer in a vertical direction, so that a first end of a first turn of the coil and a second end of a last turn of the coil serves as a starting-end and a finishing-end of the first winding, respectively. And, for the first winding, every two corresponding turns of the coil in a direction perpendicular to a plane of the circuit board are formed by winding one after another, so that the two corresponding turns of the coil are not only adjacent to each other in the direction perpendicular to the plane of the circuit board, but also electrically connected to each other.

In other embodiments, only a part of turns of the coil in the first winding 102 may be wound in the above manner. For example, the first winding includes 12 turns of coil, and 10 turns of the coil are wound according to the above-mentioned winding method, and 2 turns of the coil are wound according to the conventional winding method, which is not limited thereto. In this case, in the first winding 102, for a part of turns of the coil, a second end of the turn of the coil on one wiring layer is connected to a first end of another turn of the coil at a corresponding position on an adjacent wiring layer in a vertical direction. That is, for the part of turns of the coil, any two turns that are corresponding to each other in a direction perpendicular to a plane of the circuit board are formed by winding one after another, so that the two corresponding turns of the coil are not only adjacent to each other in a direction perpendicular to a plane of the circuit board, but also electrically connected to each other.

Further, materials of the circuit board between the two turns of the coil of the first winding 102 may be insulated. In some embodiments, an insulation material may be disposed between two layers of coil of the first winding, which is not limited thereto. Similarly, in some embodiments, the first winding may be formed by winding a wire based on the winding order described above.

The winding assembly 10 may be applied to magnetic elements, such as inductors and transformers. The transformer may be any known type, such as a circuit board planar transformer. In some embodiments, according to product requirements, the first winding 102 may be used as a primary winding of the circuit board planar transformer, or the first winding 102 may be used as a secondary winding of the circuit board planar transformer.

Figure 3:
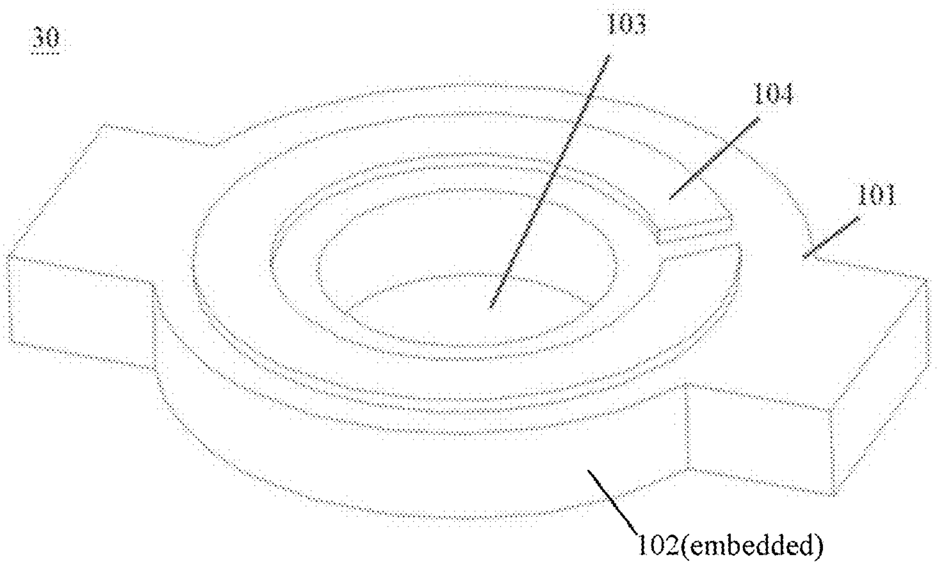
FIG. 3 is a schematic structural diagram of another winding assembly according to an exemplary embodiment.

Further, in some embodiments, as shown in FIG. 3, the winding assembly 30 may further include a second winding 104, and the second winding includes at least one turn of coil, which is only for illustration. The second winding 104 and the first winding 102 are insulated. Further, the second winding may have one or more turns. In some embodiments, the second winding 104 may be a flat copper coil.

In other embodiments, the second winding includes two layers of coil, and each layer of coil may have one or more turns. The two layers of coil may be respectively located at a first layer and a last layer in the circuit board, and the first winding 102 may be located at an intermediate layer in the circuit board. In some embodiments, the two layers of coil may be connected by vias.

In some embodiments, according to product requirements, the first winding 102 may be used as the primary winding of the circuit board planar transformer and the second winding 104 may be used as the secondary winding of the circuit board planar transformer. Alternatively, in some embodiments, the first winding 102 may also be used as the secondary winding of the circuit board planar transformer, and the second winding 104 may be used as the primary winding of the circuit board planar transformer.

In the winding assembly of the embodiment of the present disclosure, two turns of the coil adjacent to each other in the direction perpendicular to the plane of the circuit board are electrically connected which can reduce the parasitic capacitance of the winding assembly and improve the conversion efficiency.

Figure 4:
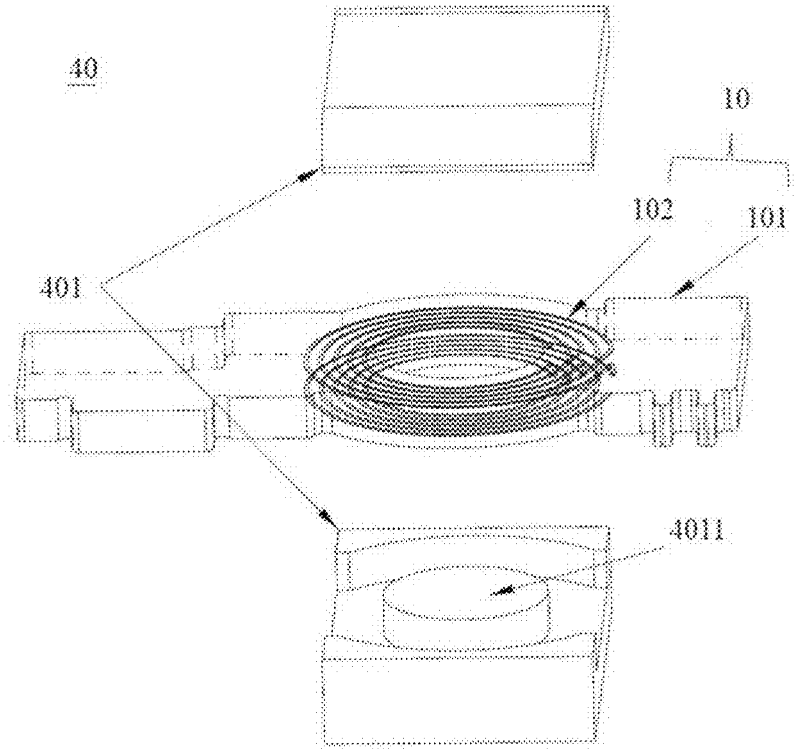
FIG. 4 is an exploded view of a magnetic element according to an exemplary embodiment.

FIG. 4 is an exploded view of a magnetic element according to an exemplary embodiment.

As shown in FIG. 4, a magnetic element 40 includes: a winding assembly 10 and a magnetic core 401, and the winding assembly 10 is sleeved on a magnetic leg 4011 of the magnetic core 401. The schematic structural diagram of the winding assembly 10 is shown in FIG. 1 and will not be repeated here. The specific winding structure is same as the above description of FIG. 2, Which will not be repeated here. In some embodiments, the magnetic core 401, the circuit board 101 with the first winding 102 are coaxially assembled into the magnetic element 40.

In some embodiments, two layers of coil of the first winding can be insulated by the circuit board, or by an additional insulation layer therebetween.

In some embodiments, a starting-end and/or a finishing-end of the first winding may be connected to an external circuit or device.

The magnetic core 401 may be made of, for example, a magnetic metal oxide composed of a mixture of iron oxide. For example, the magnetic core 401 may be made of manganese-zinc ferrite and nickel-zinc ferrite materials. The magnetic core 401 may have any suitable shape, for example, an "EI" type magnetic core and the like.

In some embodiments, the magnetic element 40 may also use the winding assembly 30 shown in FIG. 3. That is, the magnetic element 40 further includes a second winding 104, and the second winding includes at least one turn of coil, and the second winding 104 is insulated from the first winding 102. In some embodiments, the coil of the second winding 104 is located in two layers, and the number of turns of each layer may be one or more turns. In some embodiments, the second winding 104 includes two turns, one turn of the second winding 104 is located in a first layer and the other turn of the second winding 104 is located in a last layer, and the first winding 102 including more turns than the second winding 104 is located in intermediate layers.

In some embodiments, the magnetic element 40 may be a circuit board planar transformer. The first winding 102 may be used as a primary winding of the circuit board planar transformer and the second winding 104 may be used as a secondary winding of the circuit board planar transformer according to product requirements. Alternatively, the first winding 102 may be used as the secondary winding of the circuit board planar transformer, and the second winding 104 may be used as the primary winding of the circuit board planar transformer. Further, a primary switch and a secondary switch are disposed on the circuit board. The primary switch is connected to the primary winding, and the secondary switch is connected to the secondary winding. In some embodiments, the vertical projection of the primary switch or the secondary switch on the circuit board may partially overlap with the vertical projection of the primary winding or the secondary winding on the circuit board.

In the embodiment of the present disclosure, fir a winding assembly, a second end of at least one turn of the coil on one wiring layers can be connected to a first end of one turn at corresponding position on an adjacent wiring layer in a vertical direction, and a first end of a first turn of the coil and a second end of a last turn of the coil serves as a starting-end and a finishing-end of the first winding, respectively. For the first winding, any two turns of the coil that are corresponding to each other in a direction perpendicular to a plane of the circuit board are formed by winding one after another, so that the two corresponding turns of the coil are not only adjacent to each other in the direction perpendicular to the plane of the circuit board, but also electrically connected to each other directly. The winding assembly and magnetic element may reduce the parasitic capacitance and improve the conversion efficiency.

It should be noted that the block diagrams shown in the above drawings are functional entities and do not necessarily correspond to physically or logically independent entities. These functional entities may be implemented in the form of software, or implemented in one or more hardware modules or integrated circuits, or implemented in different networks and or processor devices and/or microcontroller devices.

The exemplary embodiments of the present disclosure are specifically shown and described above. It should be understood that the present disclosure is not limited to the detailed structure, arrangement, or implementation described herein; rather, the disclosure is intended to cover various modifications and equivalent arrangements included within the spirit and scope of the appended claims.

What is claimed is:

1. A winding assembly, comprising:

a circuit board with a central hole; and a first winding wound around the central hole in the circuit board and comprising N turns of coil located on at least two wiring layers;

wherein, a second end of a first turn of coil on a first wiring layer is connected to a first end of a second turn of coil at corresponding position adjacent to the first turn of coil in a direction perpendicular to a plane of the circuit board on a second wiring layer of the circuit board; starting from the second turn of the coil, every two turns of coil are classified into one coil group, and the two turns of coil of each coil group are disposed end to end in a same wiring layer; and a second end of the coil group in each wiring layer is connected to a first end of a corresponding coil group adjacent in the direction perpendicular to the plane of the circuit board in the other wiring layer.

2. The winding assembly according to claim 1, wherein, the first winding is disposed on two wiring layers in the circuit board; and the first end of the first turn of coil and a second end of a last turn of coil serves as a starting-end and a finishing-end of the first winding respectively;

when a voltage between the starting-end and the finishing-end of the first winding is $V_p$, a voltage between any two turns of coil adjacent to each other in a direction perpendicular to a plane of the circuit board is $V_p/N$.

3. The winding assembly according to claim 1, wherein, any two turns of coil adjacent to each other in the direction perpendicular to the plane of the circuit board are connected through a via.

4. The winding assembly according to claim 1, further comprising:

a second winding, disposed in the circuit board and comprising at least one turn of coil, the second winding being insulated from the first winding.

5. A winding assembly, comprising:

a circuit board with a central hole; and a first winding wound around the central hole in the circuit board and comprising N turns of coil located on at least two wiring layers; wherein, for at least some turns of the N turns of the coil, a second end of a first turn of coil among the at least some turns on a first wiring layer is connected to a first end of a second turn of coil among the at least some turns at corresponding position adjacent to the first turn of coil in a direction perpendicular to a plane of the circuit board on a second wiring layer of the circuit board; starting from the second turn of the coil among the at least some turns, every two turns of coil are classified into one coil group, and the two turns of coil of each coil group are disposed end to end in a same wiring layer; and a second end of the coil group in each wiring layer is connected to a first end of a corresponding coil group adjacent in the direction perpendicular to the plane of the circuit board in the other wiring layer.

6. The winding assembly according to claim 5, wherein, the first winding is disposed on two wiring layers in the circuit board; and when a voltage between a starting-end and a finishing-end of the first winding is $V_p$, a voltage between the any two turns of the coil adjacent to each other in the direction perpendicular to the plane of the circuit board and electrically connected to each other is $V_p/N$.

7. The winding assembly according to claim 6, wherein, the any two turns of the coil adjacent to each other in the direction perpendicular to the plane of the circuit board are connected through a via.

8. The winding assembly according to claim 6, further comprising:

a second winding, disposed in the circuit board and comprising at least one turn of coil, the second winding being insulated from the first winding.

9. A magnetic element, comprising: a magnetic core and a winding assembly, the winding assembly being sleeved on a magnetic leg of the magnetic core, wherein the winding assembly comprises:

a circuit board with a central hole; and a first winding wound around the central hole in the circuit board and comprising N turns of coil located on at least two wiring layers; and for at least some turns of the N turns of the coil, a second end of a first turn of coil among the at least some turns on a first wiring layer is connected to a first end of a second turn of coil among the at least some turns at corresponding position adjacent to the first turn of coil in a direction perpendicular to a plane of the circuit board on a second wiring layer of the circuit board; starting from the second turn of the coil among the at least some turns, every two turns of coil are classified into one coil group, and the two turns of coil of each coil group are disposed end to end in a same wiring layer; and a second end of the coil group in each wiring layer is connected to a first end of a corresponding coil group adjacent in the direction perpendicular to the plane of the circuit board in the other wiring layer.

10. The magnetic element according to claim 9, wherein the first winding is disposed on two wiring layers in the circuit board, and when a voltage between a starting-end and a finishing-end of the first winding is $V_p$, a voltage between the any two turns of the coil adjacent to each other in the direction perpendicular to the plane of the circuit board and electrically connected to each other is $V_p/N$.

11. The magnetic element according to claim 9, wherein, the any two turns of the coil adjacent to each other in the direction perpendicular to the plane of the circuit board are connected through a via.

12. The magnetic element according to claim 9, wherein, the winding assembly further comprises:

a second winding, disposed in the circuit board and comprising at least one turn of coil, the second winding being insulated from the first winding.

13. The magnetic element according to claim 12, wherein, the second winding comprises two turns of coil respectively located in a first wiring layer and a last wiring layer in the circuit board, and the first winding is located in intermediate wiring layers in the circuit board.

14. The magnetic element according to claim 13, wherein, the magnetic element is a transformer, the first winding is a primary winding of the transformer, and the second winding is a secondary winding of the transformer.

* * * * *